United States Patent
Schneider

(10) Patent No.: US 6,653,968 B1
(45) Date of Patent: Nov. 25, 2003

(54) SYSTEM FOR GENERATING A SIGNAL TO SUPERIMPOSE INFORMATION

(75) Inventor: Thomas Schneider, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 09/633,614

(22) Filed: Aug. 7, 2000

(30) Foreign Application Priority Data

Aug. 6, 1999 (DE) .......................................... 199 37 155

(51) Int. Cl.$^7$ ............................................. G08C 19/12
(52) U.S. Cl. ............. 341/178; 340/870.19; 340/870.23; 340/870.24; 375/238; 375/239; 375/242; 375/243; 341/182
(58) Field of Search ....................... 340/870.18, 870.19, 340/870.23, 870.24, 825.64; 375/238, 239, 242, 253; 341/178, 182, 179; 324/165

(56) References Cited

U.S. PATENT DOCUMENTS

| | | | | |
|---|---|---|---|---|
| 3,713,124 A | * | 1/1973 | Durland et al. ......... | 340/870.17 |
| 4,011,551 A | * | 3/1977 | Adler .................... | 340/870.28 |
| 4,028,686 A | * | 6/1977 | Wilson et al. ......... | 340/870.31 |
| 4,242,666 A | * | 12/1980 | Reschovsky et al. .. | 340/870.28 |
| 4,628,314 A | * | 12/1986 | Morinaga et al. ...... | 340/870.24 |
| 5,170,161 A | * | 12/1992 | Sakurai .................. | 340/870.3 |
| 5,202,682 A | * | 4/1993 | Finger .................... | 340/870.19 |
| 5,434,564 A | * | 7/1995 | Nakanuma ............. | 340/870.19 |
| 6,184,916 B1 | * | 2/2001 | Cianciosi .................... | 347/255 |
| 6,263,087 B1 | * | 7/2001 | Miller .......................... | 382/100 |
| 6,480,138 B1 | * | 11/2002 | Zinke et al. ................ | 341/178 |

FOREIGN PATENT DOCUMENTS

| | | |
|---|---|---|
| DE | 42 33 549 | 4/1994 |
| DE | 195 04 822 | 9/1996 |
| DE | 196 18 867 | 2/1997 |
| DE | 196 34 715 | 3/1998 |
| DE | 196 50 935 | 6/1998 |
| DE | 198 38 433 | 3/1999 |
| DE | 198 19 783 | 11/1999 |
| WO | WO 88/09026 | 11/1988 |

* cited by examiner

Primary Examiner—Michael Horabik
Assistant Examiner—Albert K. Wong
(74) Attorney, Agent, or Firm—Kenyon & Kenyon

(57) ABSTRACT

A system for generating a signal which, in addition to first information representing the rotational speed of a rotating part, contains at least second information. The signal changes over time between a first and a second current level and/or voltage level (high/low). The first information is represented by the time interval between a substantially identical change either between the first to the second level (high/low edge) or a substantially identical change between the second to the first level (low/high edge). On the other hand, the second information is represented by the length of time either of the first or of the second level. No further current levels or voltage levels are used to transmit the additional information, and that the additional information can be evaluated relatively simply. High data integrity can be attained by pulses which are as long as possible.

6 Claims, 9 Drawing Sheets

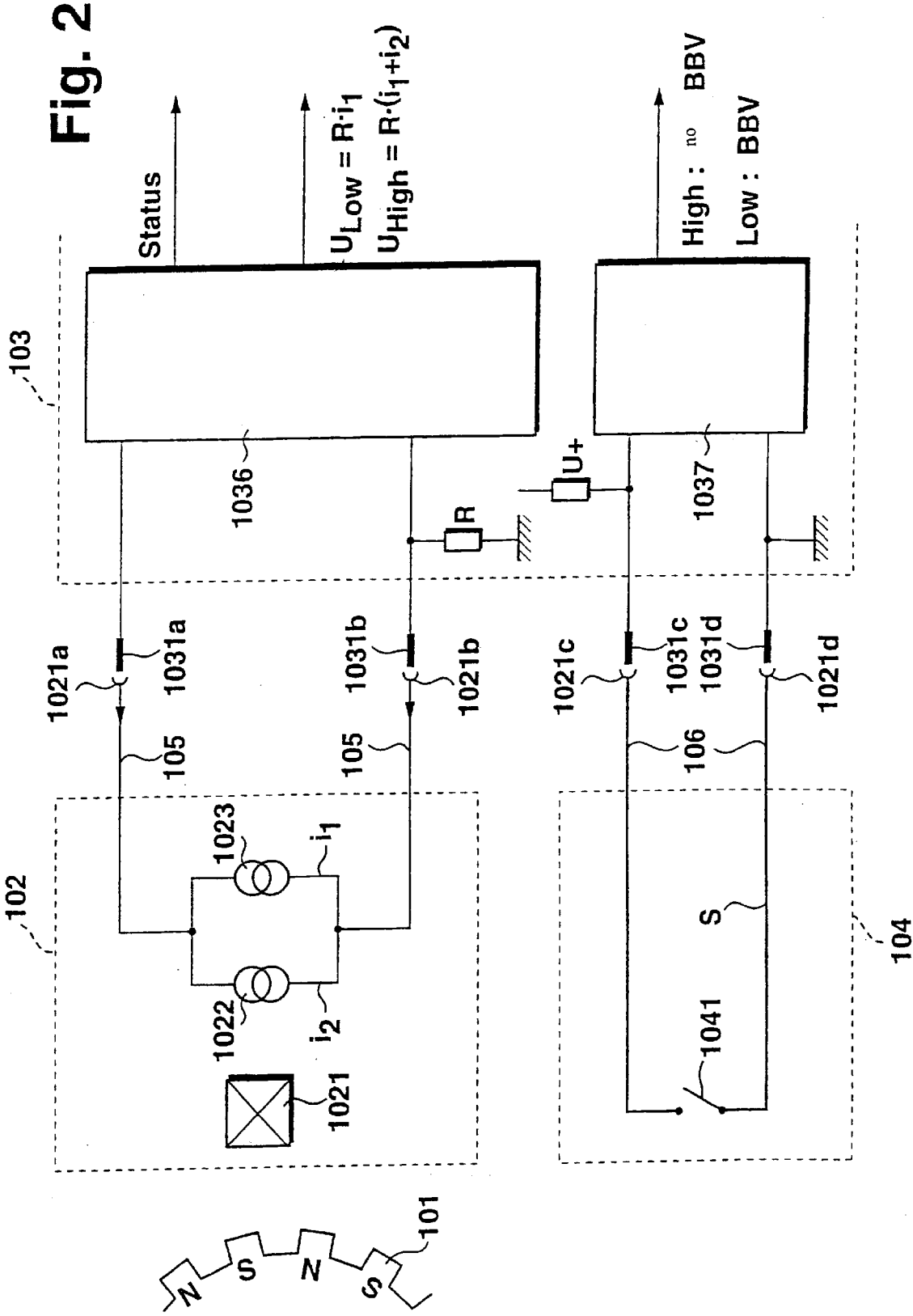

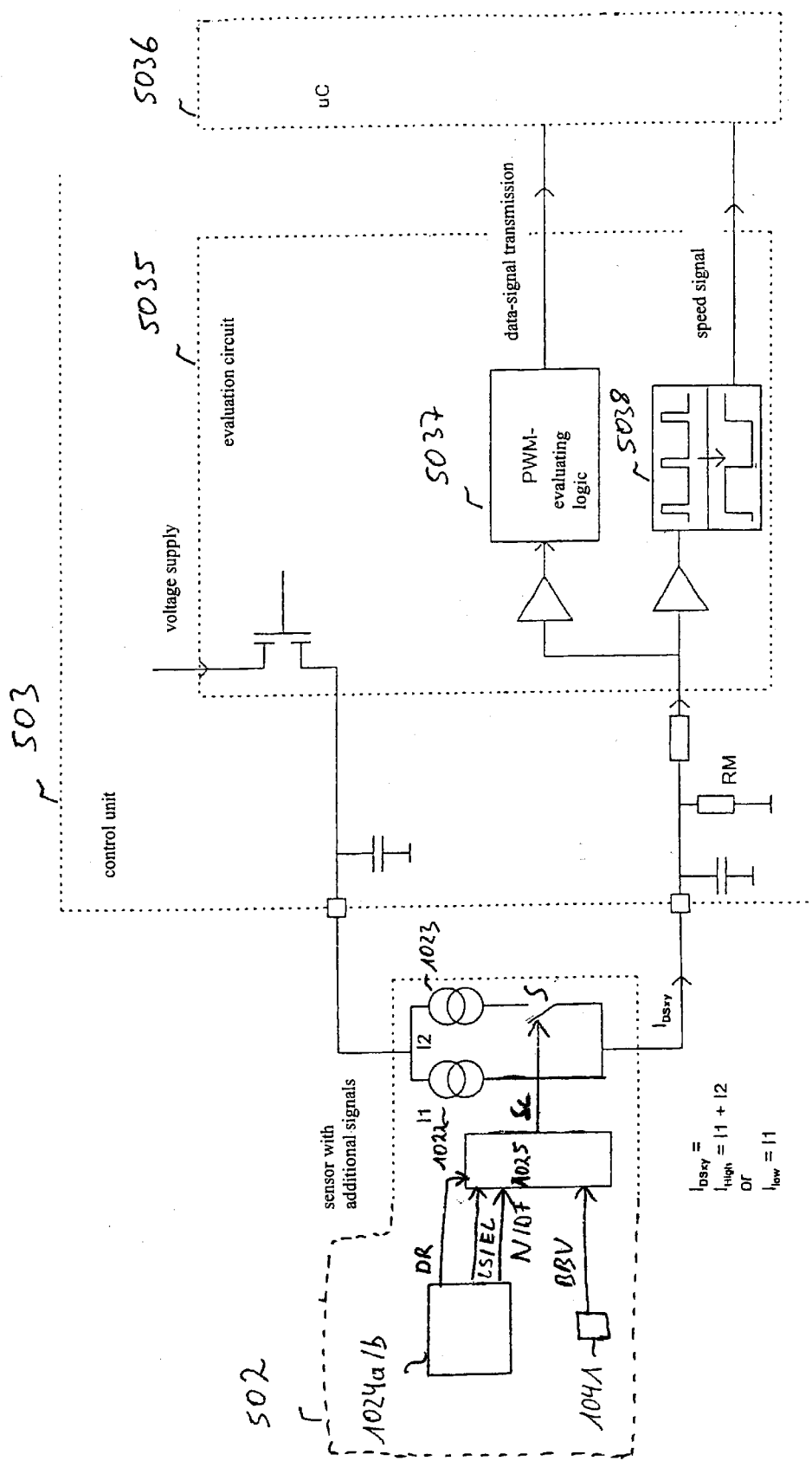

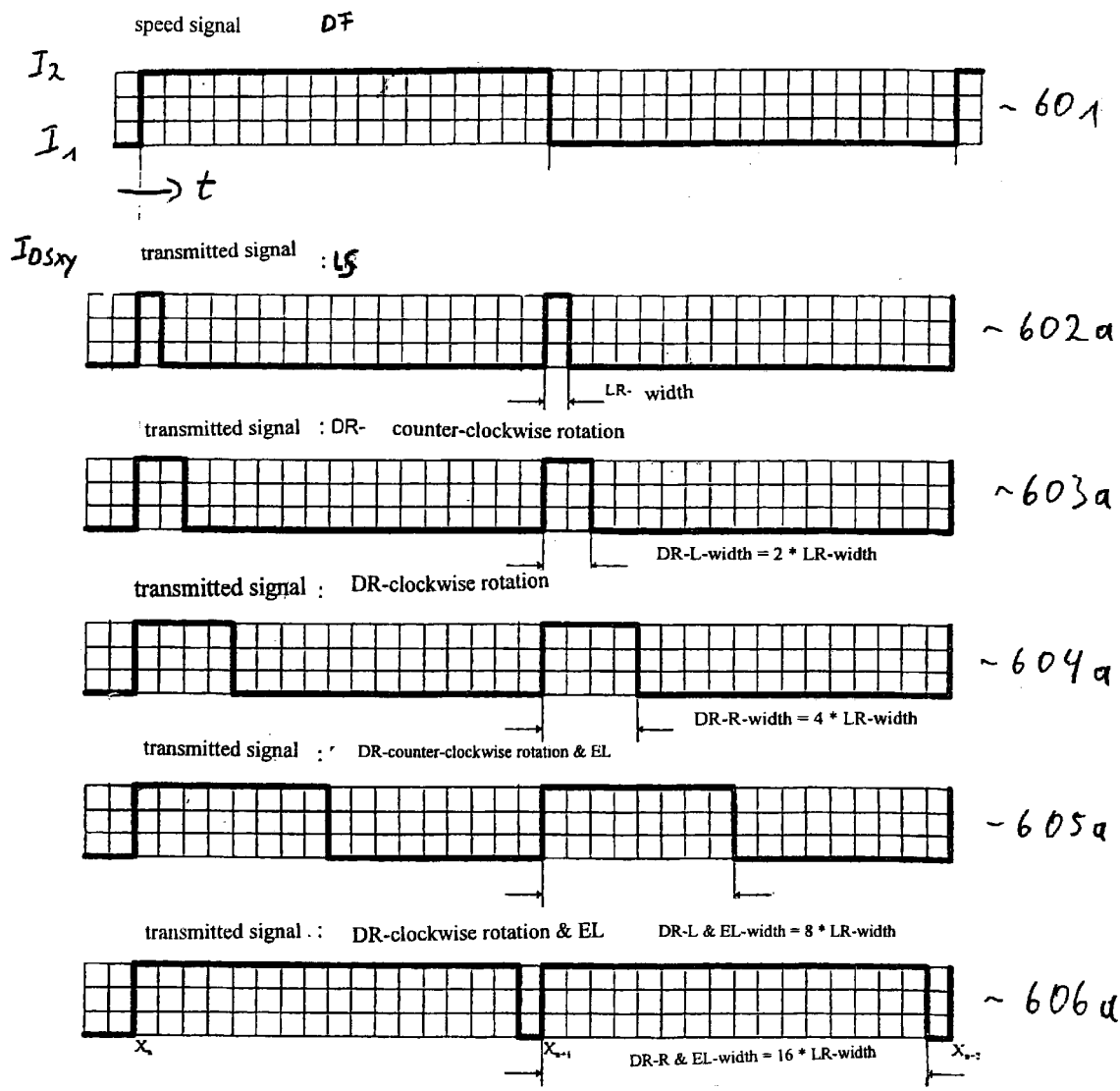
Fig. 6α

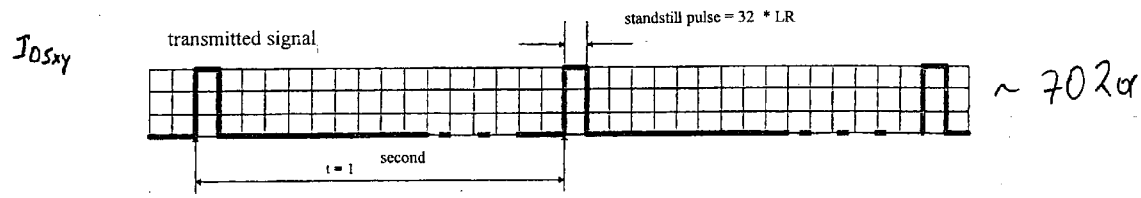
Fig. 7a
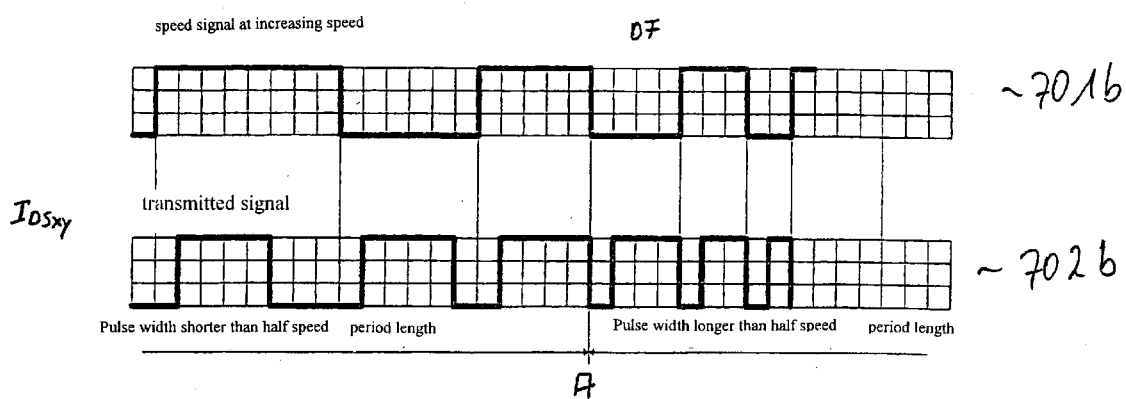
Fig. 7b

SYSTEM FOR GENERATING A SIGNAL TO SUPERIMPOSE INFORMATION

BACKGROUND INFORMATION

The present invention relates to a system for generating a signal.

Sensors are being used increasingly to control or regulate the processes in motor vehicles. However, this means that ever more sensor signals must be transmitted independently of one another to the control or regulating units. In so doing, the individual signals must meet various requirements. If the individual signals are combined to form a "composite signal", the individual requirements must be retained.

It is known to measure the speeds of the vehicle wheels in order to control or regulate the braking force, motive force and/or the dynamics of vehicular operation of a motor vehicle. A great variety of methods (e.g., Hall or magnetoresistive sensors) are set forth for this purpose in the related art. It is also known to ascertain the wear and tear of the brake lining of a vehicle brake by, for example, embedding contact pins at a certain depth of the brake linings, the contact pins triggering a contact when the brake lining is worn away to this depth.

So, for example, the article *"Integrierte Hall-Effekt-Sensoren zur Positions-und Drehzahlerkennung"* (Integrated Hall-Effect Sensors for Detecting Position and Speed), Electronic Industry 7-1995, pp. 29 through 31 describes active sensors for use in the motor vehicle for anti-lock braking, traction, engine and transmission control and regulating systems. In a two-wire configuration, such sensors supply two current levels which are converted in an appropriate control unit into two voltage levels by a measuring resistor.

In addition to the Hall-effect sensors mentioned, the use of magnetoresistive sensors for detecting speed is also known, for example, from the article *Neue, alternative Lösungen für Drehzahlsensoren im Kraftfahrzeug auf magnetoresistiver Basis*"(New, Alternative Design Approaches for Speed Sensors in the Motor Vehicle on a Magnetoresistive Basis), VDI Reports No. 509,1984.

U.S. Pat. No. 4,076,330 describes a special joint arrangement for determining the wear of a brake lining and for detecting the wheel speed. To that end, the ascertained brake-lining wear and the wheel speed, detected by an inductively operating sensor, are conducted via a joint signal line to an evaluation unit. This is achieved in that, in reaction to a detected brake-lining wear, the wheel-speed sensor is completely or partially short-circuited.

Other systems as are described, for example, in German Patent No. 43 22 440, need at least two signal lines between a wheel unit and the evaluation unit for determining the speed and the brake-lining wear at a wheel and a wheel brake, respectively.

In the case of the aforesaid speed detection, it is known that the air gap between the rotating ring gear and the actual sensor element has a considerable influence on the quality of the speed signal. Reference is made, for example, to German Patent No. 32 01 811 on this matter.

Furthermore, for example, for help when starting from rest (so-called Hillholder), information is needed about the direction of rotation of the wheels. In this case, information as to whether the vehicle is moving backwards is particularly necessary. Reference is made, for example, to German Patent No. 35 10 651 concerning this.

The above-mentioned information, as well as further information or additional information (for example, brake-lining wear, air gap, direction of rotation) is generally ascertained close to the wheel and evaluated in a control unit disposed at a distance from the wheel. To that end, the information must be transmitted to the control unit.

In the case of an engine (internal combustion engine and/or electromotor), it is known to ascertain the engine speed using inductive, magnetoresistive or Hall sensors.

The German Published Patent Application No. 196 09 062 describes superimposing the information of an analog speed signal, that periodically has two specifiable current or voltage levels, with the digital information with regard to the brake-lining wear, the air gap and/or the direction of rotation, such that the current or voltage levels of the analog speed signal are changed in coded manner. The increase in the current levels for transmitting the additional digital information has the advantage that only a two-wire connection is necessary between the sensor unit and the control unit. However, in addition to an increase in power loss, the elevated current levels lead to an increased voltage drop at the measuring resistor in the control unit. It may be that the change of the voltage levels does not increase the power loss, but it makes a three-wire connection (voltage supply, ground, signal line) necessary between the sensor unit and the control unit.

SUMMARY OF THE INVENTION

An object of the present invention is to superimpose the speed information and the additional information as simply and reliably as possible.

The present invention is based on a system for generating a signal which, in addition to first information representing the rotational speed of a rotating part, contains at least second information. The signal changes over time between a first and a second current level and/or voltage level (high/low).

The crux of the present invention is that the first information is represented by the time interval between a substantially identical change either between the first to the second level (high/low edge) or a substantially identical change between the second to the first level (low/high edge). On the other hand, the second information is represented by the length of time either of the first or of the second level.

Compared to the related art mentioned in the introductory description, the present invention has the advantage that no further current levels or voltage levels are necessary to transmit the additional information. Furthermore, the additional information can be evaluated relatively simply, since only the length of time either of the first or of the second level, thus the pulse width, has to be measured for this purpose. The present invention also offers the possibility of attaining high data integrity by pulses which are as long as possible.

In one particularly advantageous embodiment, the system of the present invention is used in a motor vehicle. The first information represents the speed of a vehicle wheel, the speed of a vehicle engine designed as a gasoline engine, diesel engine and/or electromotor, and/or the speed of a shaft functionally coupled to the vehicle transmission. The second information includes at least one information component, the information components representing the distance between the rotating part and a sensor element detecting the rotational speed, and/or the brake-lining wear at at least one vehicle wheel brake, and/or the direction of rotation (DR) of the rotating part, and/or the fitting position (EL) of a sensor element detecting the rotational speed.

In particularly advantageous manner, different priorities are assigned to the information components to be transmitted by the signal, such that in response to the presence of the information component having the highest priority, the other information components are not transmitted. This ensures that the most important information is reliably transmitted.

According to the present invention, the speed information is transmitted by the time intervals between the substantially identical changes (high/low edge or low/high edge). In a particularly advantageous refinement of the present invention, the signal is generated in such a way that, prior in time to these essentially identical changes (high/low edge or low/high edge) which are important for the speed information, the current level and/or voltage level (high/low) which the signal has prior to these changes is set for at least one specifiable time duration. The setting according to the present invention of a level prior to the actual change ("advance bit"), which is to be evaluated for the speed information, assures the reliable transmission of the speed signal in every case.

This setting of a level prior to the actual change ("advance bit") can be carried out in that a trigger signal is generated and, in reaction to the generation of the trigger signal, the signal is set to the first or second current level and/or voltage level (high/low). In doing this, provision is made in particular that the trigger signal is generated as a function of the rotational speed of the rotating part.

Another refinement of the present invention provides that, when the rotating part is stationary, the signal is generated in such a way that it has the first or second current level and/or voltage level (high/low) for a specifiably fixed time duration. This makes it possible to recognize the standstill of the rotating part. Furthermore, this also makes it possible to check the proper functioning of the sensor element and the transmission lines.

A further refinement of the present invention describes an advantageous embodiment of the evaluation of the signal generated according to the present invention. For this evaluation, from the signal generated according to the present invention, first of all a speed quantity representing the rotational speed of the rotating part is ascertained from the time interval between a (substantially identical) change either between the first to the second level (high/low edge) or a (substantially identical) change between the second to the first level (low/high edge). This speed quantity is compared to at least one threshold value. The evaluation of the length of time either of the first or of the second level for ascertaining the second information is then carried out as a function of the comparison result. Thus, the rotational speed of the rotating part is advantageously taken into account during the evaluation of the second information. In this context, it can be provided that, given the presence of higher speed quantities, only parts of the second information are evaluated. This ensures that only that second information is evaluated which can be reliably transmitted.

It is particularly provided that the information components having the highest priority are evaluated up to higher speed quantities as the information components having lower priority.

BRIEF DESCRIPTION OF THE DRAWINGS

FIG. 2 shows a simple combination of an active speed sensor together with ascertainment of brake-lining wear.

FIG. 5 shows a block diagram relating to an embodiment of the present invention.

FIG. 6a shows a signal pattern associated with the embodiment of FIG. 5.

FIG. 7a shows another signal pattern associated with the embodiment of FIG. 5.

FIG. 7b shows another signal pattern associated with the embodiment of FIG. 5.

DETAILED DESCRIPTION

Figure 1:
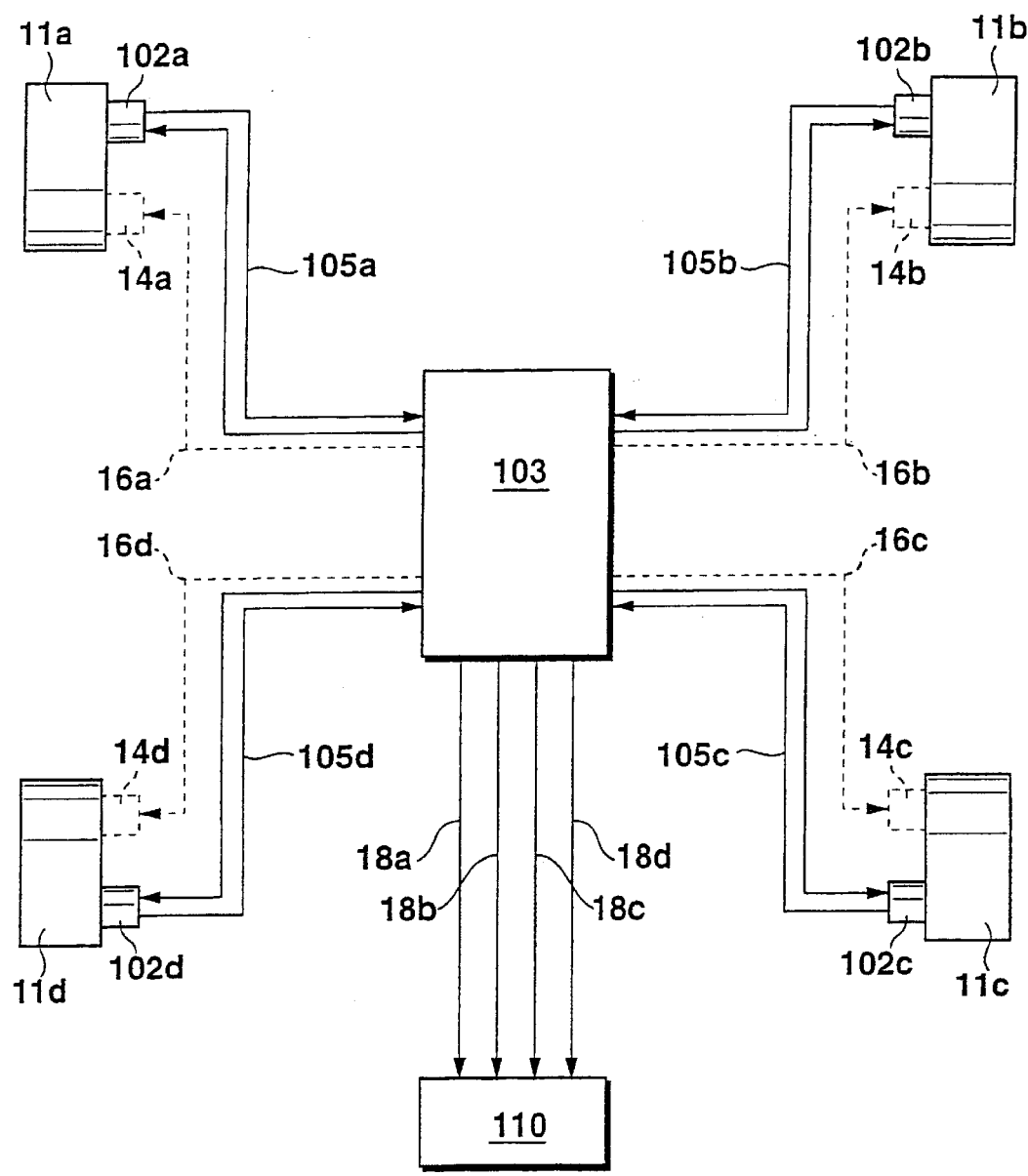
FIG. 1 shows schematically a block diagram as is known from the related art.

The present invention shall be described in detail based on the specific embodiments described in the following.

The figure shows, as a synoptic block diagram, a system for ascertaining brake-lining wear and wheel speeds in a motor vehicle.

Reference numerals 11a–d designate the wheel units of a motor vehicle. Belonging to these wheel units are, in particular, the wheels whose rotational speeds (the wheel speeds) are to be measured and the braking system (friction brake) allocated to each wheel unit. Reference numerals 102a–d designate the speed sensors and brake-lining-wear sensors, allocated to each wheel, which are described in greater detail based on FIGS. 2 and 3, respectively, to the extent it relates to the present invention. For information about the design of these sensors going beyond the present invention, reference is made specifically to the related part mentioned at the outset.

The output signals of speed sensors and brake-lining-wear sensors 102a–d are linked (transmitted) to control unit 103, the transmission lines being represented by 105a–d. The information transmitted with the aid of transmission lines 105a–d is then centrally evaluated in control unit 103 for all wheel units. The condition of the brake linings is supplied as an evaluation result from control unit 103 via lines 18a–d to display instrument 110. Moreover, it is generally provided that, given a certain degree of wear of one or more brake linings, the driver receives corresponding information.

For the sake of completeness, reference numerals 14a–d sketch the braking systems of individual wheel units 11a–d which can be controlled from control unit 103.

FIG. 2 shows a simple combination of an active speed sensor with ascertainment of brake-lining wear. As already mentioned at the outset, a known Hall speed sensor or a known magnetoresistive speed sensor can be provided as "active" speed sensor 102. Moreover, FIG. 2 shows schematically that a sensor element 1021 samples an incremental rotor 101 (trigger wheel) of a magnetic passive type. Sensor element 1021 sets two current levels $i_1$ and $i_2$ as a function of the sampled increments of rotor 101. This is shown in FIG. 2 by the switch-on and switch-off of two current sources 1022 and 1023.

Speed sensor 102 is connected to control unit 103 via lines 105, i.e. via plug connections 1021a and b, and 1031a and b. Input amplifier 1036, with the aid of input resistor R, detects the voltage values $U_{Low}=R*i_1$ $U_{High}32 R*(i_1+i_2)$ corresponding to the current levels of speed sensor 102. A typical profile when the wheel speed is essentially constant can be seen in upper signal characteristic 601 of FIGS. 6a and 6b. The desired wheel speed is attained by evaluating the frequency of this signal.

The lower part of FIG. 2 shows schematically a known detection 1104 of the brake-lining wear at a wheel brake. As already mentioned at the outset, the brake-lining-wear sensor known from the related art ascertains the wear of the brake lining of a vehicle brake, in that, for example, contact pins are embedded at a certain depth of the brake linings, the contact pins triggering a contact when the brake lining is worn out up to this depth. This contact is designated in FIG. 2 by switch 1041. In the normal case (no relevant brake-lining wear to be displayed), switch 1041 is open, during which voltage U+ is not grounded. When the brake lining reaches a certain degree of wear, switch 1041 is closed, which, because of the grounding by connection 106, i.e. plug connection 1012 and 1031, is detected in evaluation circuit 1037.

As can be seen in the specific embodiment shown in FIG. 2, separate signal lines 105 and 106 in each case transmit the wheel-speed information and the information about the condition of the brake lining.

Figure 3A:
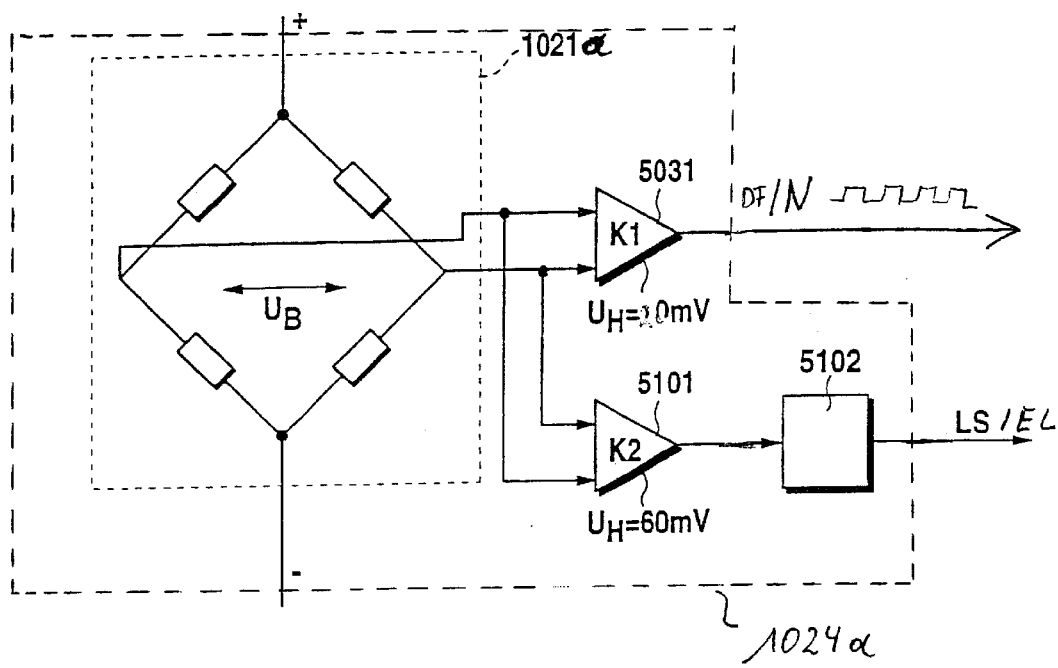
FIG. 3a shows a block diagram relating to the ascertainment of an air gap and a direction of rotation.

FIG. 3a shows, by way of example, the detection of an excessive distance of a Hall sensor, i.e. magnetoresistive sensor, with respect to the already-described ring gear of the vehicle wheel whose rotational speed is to be detected. Sensor element 1021a can be the sensor element in FIG. 2, designated by the same reference numeral. Element 1021a is generally designed as a familiar Wheatstone bridge having a typical ring-shaped arrangement of resistors. In this Wheatstone bridge, bridge voltage $U_B$, which is supplied to comparators 5031 and 5101, is produced by the gliding-past of the individual segments of the ring gear (101 in FIG. 2), not shown. Comparator K1 is used to evaluate the wheel speed. A further evaluation of the bridge voltage is carried out in comparator K2 5101, such that this bridge voltage is compared to a relatively high threshold value $U_H$. The background of the two threshold-value comparisons shall be discussed in the following in FIG. 3b.

Figure 3B:
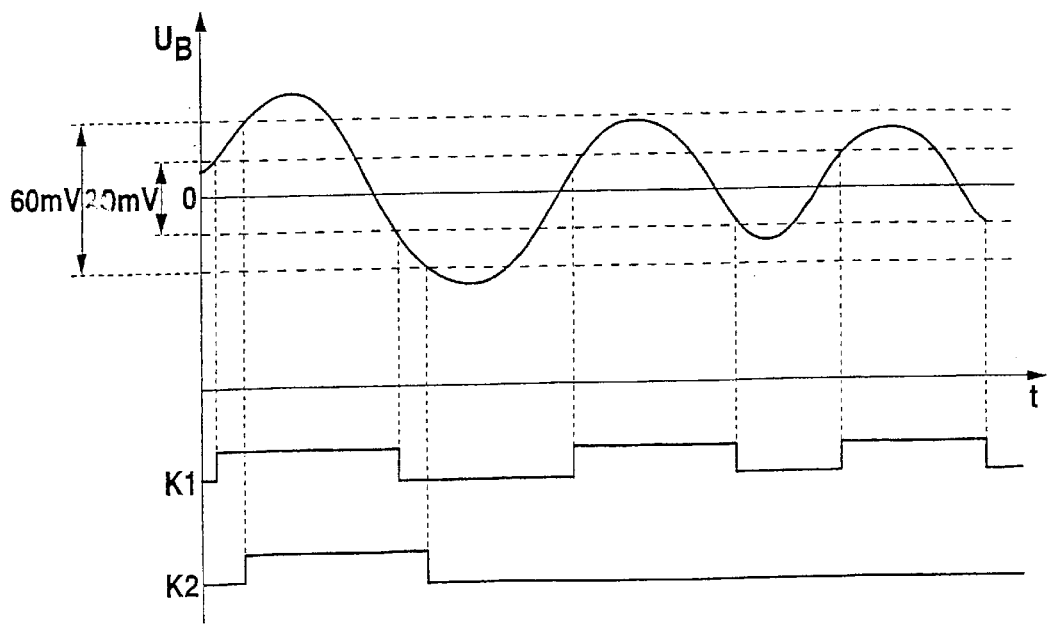
FIG. 3b shows a signal pattern relating to the ascertainment of the air gap and the direction of rotation.

FIG. 3b shows a typical signal pattern of the bridge voltage over time. The bridge voltage increases and decreases periodically depending upon the speed with which the individual segments of the ring gear glide past. If the distance, the air gap, between the ring gear and Wheatstone bridge 1021a remains constant, then the bridge voltage has a constant amplitude. However, if this distance becomes too great, then the amplitude of the bridge voltage decreases. This case is shown in FIG. 3b.

A first threshold-value comparison in comparator 5031 compares the bridge-voltage signal to a relatively low threshold value, e.g., 40 mV. On the output side, comparator 5031 then delivers the driving signal, shown in lower signal pattern K1 of FIG. 3b, for current sources $i_1$, and $i_2$ (see FIG. 2). Thus, signal K1 represents the wheel speed, even in the case of an increasing air gap. Comparator 5101 checks the amplitude of the bridge-voltage signal, in that a relatively high threshold of, e.g., 60 mV is set in this comparator. If the distance between the ring gear and the Wheatstone bridge, the air gap, is sufficiently small, then the amplitude of the bridge-voltage signal lies above the threshold of comparator 5101. As can be seen in lower signal pattern K2 in FIG. 3b, in the proper case, the output signal of comparator 5101 shows a time delay of signal K1 with respect to signal K1. However, if comparator signal K2 fails to appear, then the amplitude of the bridge-voltage signal decreases, which indicates an excessive air gap.

The absence of signal K2 is detected in unit 5102, an absence of signal K2 resulting in generation of digital signal LS.

In summary, it can be said concerning the air-gap detection that the speed signals of a wheel are detected with the aid of an active sensor, e.g. a Hall sensor or a magnetoresistive sensor. The sensors include a Wheatstone bridge which is unbalanced by a changing magnetic field. The signal for the speed is obtained from this unbalance. The amount of the unbalance is in a fixed proportion to the amount of the magnetic-field difference between the two bridge halves. The magnetic-field difference is a function, inter-alia, of the distance of the sensor to the magnet wheel. If the amount of the bridge unbalance is evaluated, it is possible to infer the air gap between the sensor and the magnet wheel. This evaluation can be carried out with a comparator 5101 which has a greater hysteresis ($U_H$=60 mV) than normal useful-signal comparator 5031 ($U_H$=20 mV). If the air gap is small, then both comparators are switched; however, if the air gap is too large, then only useful-signal comparator 5031 is switched. In this manner, an early warning system for an air gap which is too large is provided, without at the same time losing the wheel-speed information. For example, this information can be used as a control at the end of the production line when producing the motor vehicle, in the service station or while driving.

The incorrect fitting position of sensor 1021a can be detected by the introduction of a third threshold of, e.g., 30 mV, not shown in FIG. 3b. If the signal shown in FIG. 3b does not exceed the low threshold of 30 mV, for example, then this suggests that sensor element 1021a has been incorrectly installed. An appropriately adjusted comparator, not shown in FIG. 3a, then emits signal EL "incorrect fitting position". The function of the third comparator is assigned to second comparator 5101 in FIG. 3a.

Thus, overall sensor element 1024a shown in FIG. 3a delivers signals EL and LS in addition to speed signal N or DF. For example, signal EL can assume the value 1 when the fitting position of sensor element 1021a is incorrect, and the value 0 when the fitting position is correct. Signal LS can assume the value 1 when the air gap between sensor element 1021a and trigger wheel 101 is unacceptably large, for example, and the value 0 when the air gap is sufficiently small.

Figure 4A:
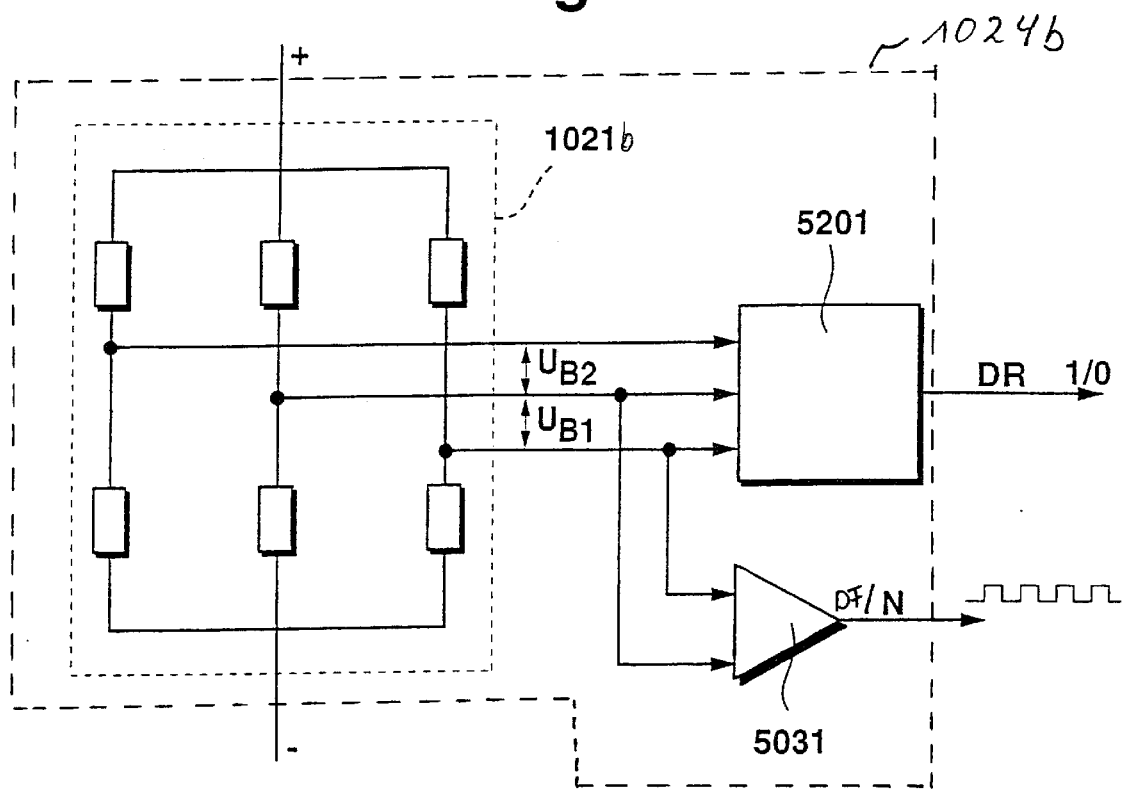
FIG. 4a shows another block diagram relating to the ascertainment of the air gap and the direction of rotation.
Figure 4B:
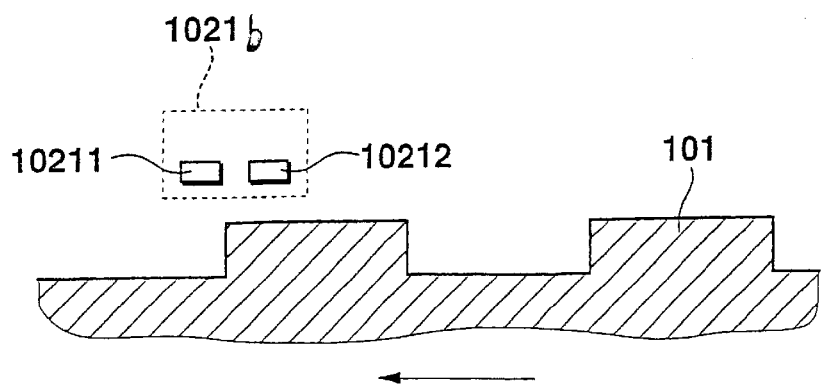
FIG. 4b shows another block diagram relating to the ascertainment of the air gap and the direction of rotation.

FIGS. 4a and 4b show, by way of example, the evaluation for detecting the direction of rotation of a wheel. To this end, a Hall sensor or magnetoresistive sensor 1021b, which has been modified compared to FIG. 3a, is provided in FIG. 4a. The modification lies in the fact that the known Wheatstone bridge, as can be seen in FIG. 3a, has been supplemented by two further resistors. Instead of the modified Wheatstone bridge, the modified Hall sensor or magnetoresistive sensor can also be composed of at least two separate sensitive elements 10211 and 10212, i.e. of two complete Wheatstone bridges. Here as well, the individual elements of the ring gear, magnet wheel or trigger wheel (101, FIG. 2) produce corresponding changes in bridge-voltage signals $U_{B1}$ and $UB_2$. These bridge-voltage signals are supplied to evaluation unit 5201. At the same time, at least one of the bridge-voltage signals is supplied to comparator 5031, already described, for the evaluation of the useful signal. The functioning of rotation-direction detection 5201 shall be explained with reference to FIGS. 4c and 4d.

Figure 4C:
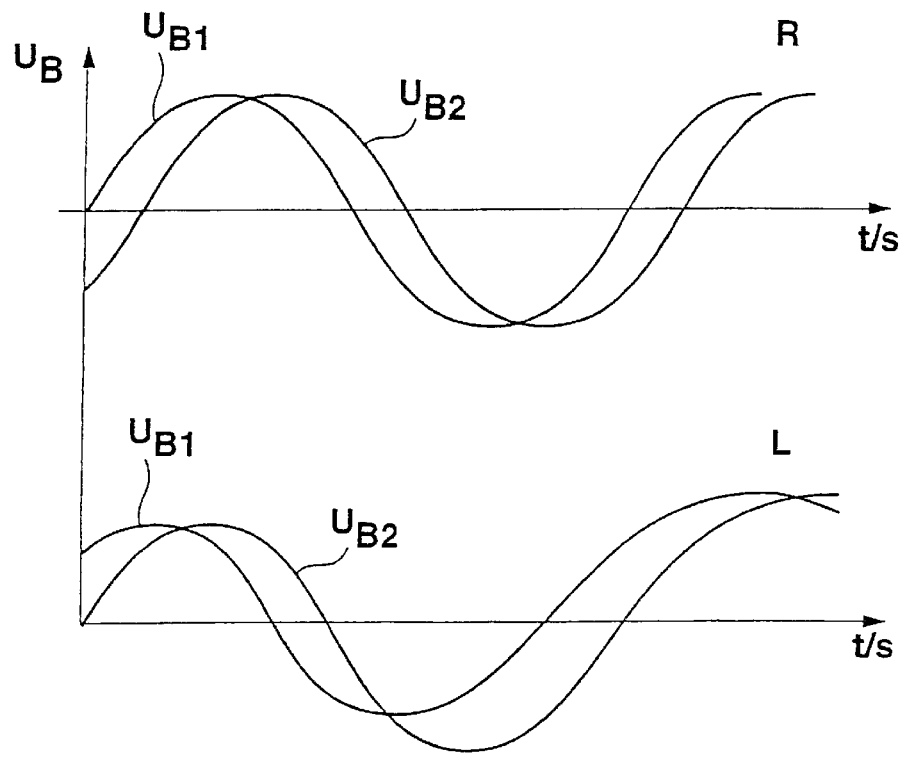
FIG. 4c shows another signal pattern relating to the ascertainment of the air gap and the direction of rotation.
Figure 4D:
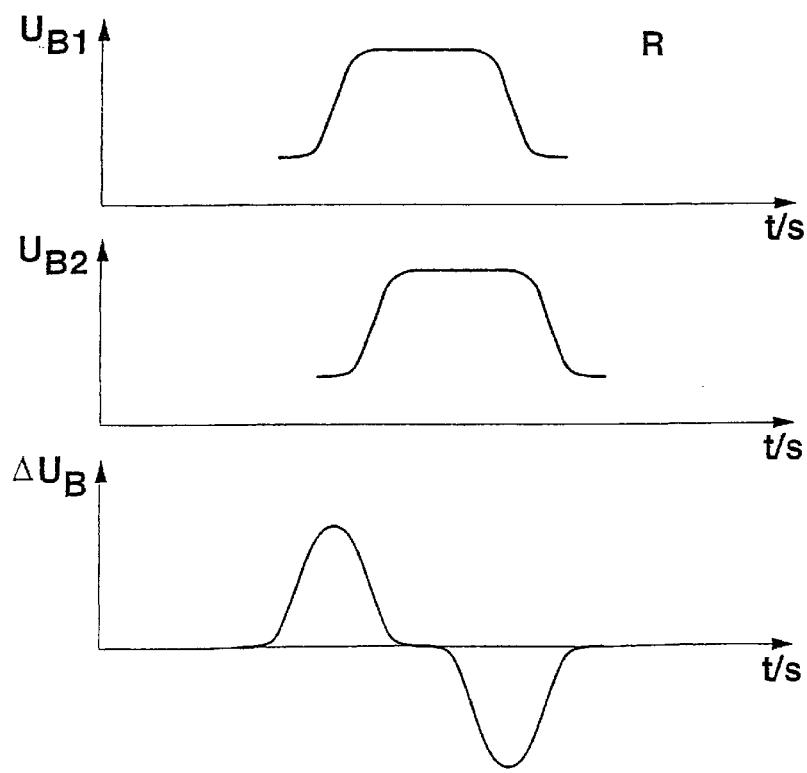
FIG. 4d shows another signal pattern relating to the ascertainment of the air gap and the direction of rotation.

FIGS. 4c and 4d depict the pattern of the bridge-voltage signals shown in FIG. 4a. The pattern over time t or the pattern over path s, i.e., over the rotational angle of the trigger wheel can be considered. Depending upon the direction of rotation of the wheel, either the right part or the left part of modified Wheatstone bridge 5030' becomes unbalanced first. In response to a clockwise rotation of the wheel, bridge voltage $U_{B1}$ is ahead of bridge voltage $U_{B2}$, while the reverse is true in response to a counter-clockwise rotation of the wheel. The phase shift of the two bridge-voltage patterns is evaluated by rotation-direction evaluation 5201, whereupon signal DR is generated if the wheel is moving backwards. Alternatively, as can be seen in FIG. 4d, difference $\Delta U_B$ can be formed between the two bridge-voltage values $U_{B1}$ and $UB_2$. The information DR about the direction of rotation (forwards/backwards) is obtained from the pattern of this difference $\Delta U_B$, particularly from the positions of the maxima and minima (peaks "upward" or "downward").

Thus, in addition to speed signal N or DF, overall sensor element 1024b, shown in FIG. 4a, supplies digital rotation-direction signal DR having the values 1/0.

FIG. 5 shows a refinement of the system according to the present invention. Reference numeral 502 indicates a sensor unit with additional signals, and reference numeral 503 indicates an evaluation unit.

Belonging first of all to sensor unit 502 is overall sensor element 1024a/b. In this context, element 1024a/b, as a combination of described elements 1024a and 1024b, is intended to supply both speed signal N or DF, as well as additional signals LS, EL and DR. Switch 1041, described with reference to FIG. 2, for detecting brake-lining wear BBV also belongs to sensor unit 502.

Speed signal DF and additional signals EL, LS, DR and BBV are supplied to unit 1025. Current source 1023 I2 is switched on or off by unit 1025 with the aid of switching signal Sc and switch S.

The functioning method of unit 1025 is shown first of all in a first form with reference to FIG. 6a.

Original speed signal DF is shown first of all in upper signal characteristic 601 of FIG. 6a. In the exemplary embodiment described here, each change (edges) of the DF signal (signal characteristic 601) from low (current value I1) to high (current value I2) and conversely from high to low is used as a trigger signal to induce a current pulse of specifiable duration. The duration is a function of the values of additional signals EL, LS, DR and BBV.

During normal operation, trigger wheel 101 (FIG. 2) rotates either clockwise or counter-clockwise. This is indicated by signal DR. For example, if trigger wheel 101 is in counter-clockwise rotation, then current pulses of 100 μs duration are induced or triggered by the edges of signal DF. Correspondingly, switching signal Sc is formed by unit 1025, so that the time pattern of signal $I_{DSxy}$ shown in signal characteristic 603a is present at the output of unit 502. If the trigger wheel 101 is in clockwise rotation, then pulses of the duration 200 μs are produced. The signal pattern shown in signal characteristic 604a is then present.

Signal characteristics 605a and 606a show the time patterns of signal $I_{DSxy}$ in the case in which an incorrect fitting position (signal EL) exists during a counter-clockwise rotation (605a, pulse duration: 400 μs) or during a clockwise rotation (606a, pulse duration: 800 μs).

Signal characteristics 605a and 606a are of particular importance when, after the installation of a sensor element, e.g., during the fabrication of the vehicle or in the service station, the correct fitting position is to be checked.

A pulse duration of, e.g., 600 μs can be induced for transmitting an excessive wear of the brake lining. This cannot be seen in FIG. 6a.

If the presence of a corresponding value LS indicates that an excessive air gap exists, then a (relatively short) pulse duration of 50 μs is induced. This can be seen in signal characteristic 602a. Since, for example, in the sensing of the wheel speed in a braking system, the presence of an excessive air gap is relevant to safety, all other additional information DR, EL and BBV is cross-faded in response to the presence of signal LS. This means that, in addition to the actual speed information, only the information "excessive air gap" is transmitted by the triggering of the 50 μs pulse. That is to say, that neither a rotation-direction signal nor the fitting-position signal nor the brake-lining wear signal is transmitted when the air gap is at its limit.

In each case, the actual speed information is in the time interval between the low-high edges of signal $I_{DSxy}$.

Figure 6B:
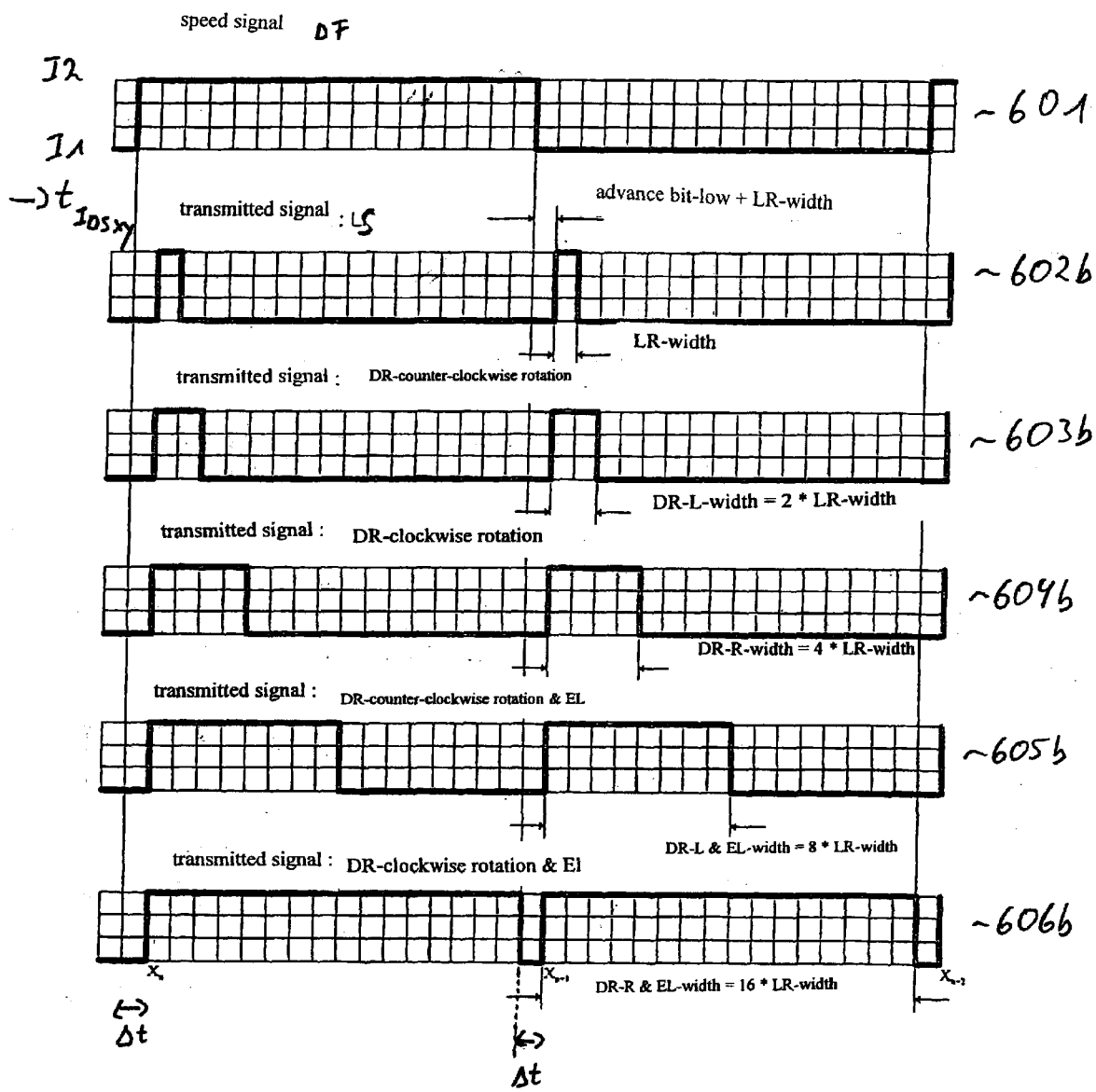
FIG. 6b shows another signal pattern associated with the embodiment of FIG. 5.

Similar conditions underlie the signal patterns shown in FIG. 6b as those depicted in FIG. 6a. The difference is that, prior to the inducing or triggering of the pulses by the edges of signal DF (signal characteristic 609), signal $I_{DSxy}$ is first of all set to value I1, i.e. low, for a specific time duration $\Delta t$. This also occurs when level I2 is set by the additional information to be transmitted. The interposing of such a low bit of, e.g. 50 μs ensures that the speed information is reliably transmitted in every case, thus even in the case of a "long" high level due to the additional information.

Except for the interposed low bit, signal characteristics 602b through 606b are identical to those in FIG. 6a.

While till now, the operating states were depicted in which trigger wheel 101 is rotating, the signal pattern of signal $I_{DSxy}$ when at standstill shall be described with reference to FIG. 7.

If no edge change of speed signal DF occurs within a specifiable time, e.g. within a second (signal characteristic 701a), sensor element 502 nevertheless outputs a signal $I_{DSxy}$ as in signal characteristic 702a. In the example shown, the time interval between two such standstill pulses is 1 s. Here, the pulse duration amounts to 32 times the LS pulse duration of 50 μs, thus 1.6 ms. This pulse width is also output after an undervoltage, as long as no speed signal DF is detected.

FIG. 7b shows the situation at higher rotational speeds, i.e. at increasing rotational speeds. This is recognized from the rising frequency of signal DF in signal characteristic 701b.

In response to rising speed, the problem occurs that the pulse width (in this example 200 μs) containing the additional information (LS, EL, DR, BBV) is possibly longer than the half period length of speed signal DF. Prior to point of time A shown in FIG. 7b, the pulse width is shorter than the half speed period. Thus, prior to point of time A, the additional information can be reliably transmitted with the corresponding pulse width. However, after this point of time A, the half period length of signal DF is too short for the pulse width.

Therefore, up to a specific rotational speed, e.g. to approximately 50 km/h for a vehicle wheel and a pulse duty factor $TV_{limit}$ of 0.3, for example, the signal pulse width can be output correctly, thus in full length. Above this speed (at point of time A in FIG. 7b) only a reduced pulse width can be output. This is taken into account in evaluation 503 yet to be described. Evaluation 503 recognizes these limits and, above these limits, evaluates only the signals whose pulse width can be reliably transmitted.

In FIG. 5, signal $I_{DSxy}$ is supplied to evaluation 503 by appropriate contacts. Blocks 5037 and 5038 are used for evaluation circuit 5035.

After amplification in incoming circuit, the pulse widths of signal $I_{DSxy}$ (see, for example, FIGS. 6a, 6b, 7a and 7b) are evaluated in pulse-width modulation/PWM-evaluating logic 5037. As mentioned, an additional signal is allocated to each pulse width; this allocation is stored in evaluation 503. Thus, additional information (LS, EL, DR, BBV) can be fed to computer 5036.

After amplification in incoming circuit, the time interval between two pulse edges from low to high is ascertained in block 5038. As already mentioned, this corresponds to the rotational frequency which is fed to computer 5036 for further evaluation.

In block 5038, the two signal characteristics show schematically that each low-high signal edge of the upper signal characteristic, which represents signal $I_{DSxy}$, causes a change between the current or voltage levels in the lower signal characteristic. In this manner, the (original) speed DF is reconstructed in block 5038.

As already mentioned, the limits up to which the pulse widths containing the additional information can be reliably transmitted are stored in block 5037. Above the limits, the additional information is no longer supplied to computer 5036.

In summary:

As the exemplary embodiment shows, only two current or voltage levels are used for the data transmission of the present invention between sensor element 502 and evaluation circuit 503.

The evaluation of the additional information is relatively simple, since only the pulse width has to be measured in evaluation 503. Data integrity can be improved by pulses which are as long as possible, since such pulses permit maximum interference suppression (filtering).

Due to the present invention, at least in principle, only one single pulse is sufficient for transmitting the additional information. The present invention also has the distinction that only a few edge changes are used, resulting in low noise radiation of signal $I_{DSxy}$.

The additional information which is only used at low rotational speeds (e.g. fitting position EL) is allocated to long pulses, while additional information which is used at maximum rotational speeds (e.g. air gap LS) is represented by short pulses.

The interposing of low time duration Δt ensures reliable transmission of the rotational speed, even at high frequency (high rotational speed).

The standstill signal transmission approximately every second and the associated typical pulse width permits monitoring of the sensor and of the lines.

The fitting position of the speed sensor can be checked during production at the end of the production line or in the service station by the transmission of a fitting-position bit (EL).

What is claimed is:

1. A system, comprising:
an arrangement for generating a signal containing first information representing a rotational speed of a rotating part and containing at least second information, the signal changing over time between a first level and a second level of at least one of a current and a voltage, wherein:
the first information is represented by a time interval between one of a substantially identical change from the first level to the second level and a substantially identical change from the second level to the first level, and
the at least second information is represented by a length of time of one of the first level and the second level.

2. The system according to claim 1, wherein:
the system is used in a motor vehicle,
the first information represents at least one of a speed of a vehicle wheel, a speed of a vehicle engine designed as at least one of a gasoline engine, a diesel engine, and an electromotor, and a speed of a shaft functionally coupled to a vehicle transmission,
the at least one second information includes at least one information component representing at least one of:
a distance between the rotating part and a sensor element detecting the rotational speed,
a brake-lining wear at at least one vehicle wheel brake,
a direction of rotation of the rotating part, and
a fitting position of the sensor element detecting the rotational speed.

3. The system according to claim 2, wherein:
each of the at least one information component to be transmitted by the signal corresponds to different priorities, such that, in response to a presence of a component of the at least one information component having the highest priority, each other component of the at least one information component is not transmitted.

4. The system according to claim 1, wherein:
the signal is generated in such a way that, prior in time to a change from one of a high edge to a low edge and the low edge to the high edge, at least one of a current level and a voltage level which the signal has prior to the change is set for at least one specifiable time duration.

5. The system according to claim 4, wherein:
a trigger signal is generated and, in reaction to a generation of the trigger signal, the signal is set to one of the first level and the second level of at least one of the current and the voltage, and
the trigger signal is generated as a function of the rotational speed of the rotating part.

6. The system according to claim 1, wherein:
when the rotating part is stationary, the signal is generated in such a way that the signal has one of the first level and the second level of at least one of the current and the voltage for a specifiably fixed time duration.

* * * * *

UNITED STATES PATENT AND TRADEMARK OFFICE
CERTIFICATE OF CORRECTION

PATENT NO. : 6,653,968 B1
DATED : November 25, 2003
INVENTOR(S) : Schneider et al.

It is certified that error appears in the above-identified patent and that said Letters Patent is hereby corrected as shown below:

<u>Column 5,</u>
Line 8, change "$U_{High}32R*(i_1+i_2)$" to -- $U_{High} =R*(i_1+i_2)$ --

Signed and Sealed this

Fourteenth Day of December, 2004

JON W. DUDAS
*Director of the United States Patent and Trademark Office*